(12) United States Patent
Honda et al.

(10) Patent No.: US 11,845,835 B2
(45) Date of Patent: Dec. 19, 2023

(54) POLYMER COMPOUND HAVING LOPHINE STRUCTURE

(71) Applicant: The University of Tokyo, Tokyo (JP)

(72) Inventors: Satoshi Honda, Tokyo (JP); Taro Toyota, Tokyo (JP)

(73) Assignee: The University of Tokyo, Tokyo (JP)

( * ) Notice: Subject to any disclaimer, the term of this patent is extended or adjusted under 35 U.S.C. 154(b) by 546 days.

(21) Appl. No.: 17/053,015

(22) PCT Filed: May 13, 2019

(86) PCT No.: PCT/JP2019/018895
§ 371 (c)(1),
(2) Date: Dec. 23, 2020

(87) PCT Pub. No.: WO2019/221051
PCT Pub. Date: Nov. 21, 2019

(65) Prior Publication Data
US 2021/0238364 A1 Aug. 5, 2021

(30) Foreign Application Priority Data

May 17, 2018 (JP) .................................. 2018-095708

(51) Int. Cl.
*C08G 77/388* (2006.01)
*C07F 7/08* (2006.01)
(Continued)

(52) U.S. Cl.
CPC .......... *C08G 77/388* (2013.01); *C07F 7/0896* (2013.01); *C08F 285/00* (2013.01);
(Continued)

(58) Field of Classification Search
CPC ..................................................... C08G 77/80
See application file for complete search history.

(56) References Cited

U.S. PATENT DOCUMENTS

| | | |
|---|---|---|
| 2009/0256121 A1 | 10/2009 | Ono |
| 2011/0306743 A1 | 12/2011 | Abe |

FOREIGN PATENT DOCUMENTS

| | | | |
|---|---|---|---|
| JP | 2009276760 A | | 11/2009 |
| JP | 2017-149793 | * | 8/2017 |
| KR | 20160038988 A | | 4/2016 |
| WO | 2010061579 A1 | | 6/2010 |

OTHER PUBLICATIONS

International Search Report received in PCT/JP2019/018895, dated Aug. 13, 2019.
(Continued)

*Primary Examiner* — Marc S Zimmer
(74) *Attorney, Agent, or Firm* — Suzannah K. Sundby, Esq.; Canady + Lortz LLP

(57) ABSTRACT

Objects of the present invention are to provide a novel functional silicon-containing polymer compound to which a property capable of controlling fluidity by a light stimulus is imparted and to provide a method capable of efficiently synthesizing such a polymer compound while maintaining molecular stability. Provided is a polymer compound characterized by having a backbone structure consisting of a silicon-containing polymer, and having N number of partial structures represented by the following formula (1) at the end or side chain of the backbone structure, N being 2 or more.

[CHEM. 1]

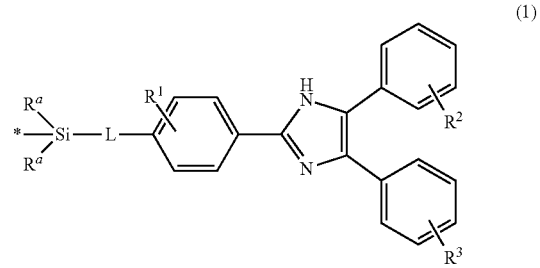

(1)

(In the formula, * represents a linking point with the backbone structure; L is a direct bond, a silicon-containing spacer group or a $C_1$-$C_5$ alkylene group; $R^a$ is independently a $C_1$-$C_5$ alkyl group; $R^1$ is 1 to 4 substituents, which are the same or different, independently selected from the group consisting of a hydrogen atom, a halogen atom, a nitro group, and an alkyl group, an alkenyl group, an aryl group, a sulfo group, a carboxy group, an ester group, a thioester group, a dithioester group, a carbonate group, a thiocarbonate group, a dithiocarbonate group, a trithiocarbonate group, a carbamate group, a thiocarbamate group, a dithiocarbamate group, an ether group, a hydroxy group, a thiol group, a sulfide group, a disulfide group, a silyl group, an amino group, or an amide group, each of which is optionally substituted; and $R^2$ and $R^3$ are each 1 to 5 substituents, which are the same or different, independently selected from the group consisting of a hydrogen atom, a halogen atom, a nitro group, and an alkyl group, an alkenyl group, an aryl group, a sulfo group, a carboxy group, an ester group, a thioester group, a dithioester group, a carbonate group, a thiocarbonate group, a dithiocarbonate group, a trithiocarbonate group, a carbamate group, a thiocarbamate group, a dithiocarbamate group, an ether group, a hydroxy group, a thiol group, a sulfide group, a disulfide group, a silyl group, an amino group, or an amide group, each of which is optionally substituted.)

21 Claims, 2 Drawing Sheets

(51) Int. Cl.
  *C08F 285/00* (2006.01)
  *C08G 77/50* (2006.01)
  *C08L 83/04* (2006.01)
  *C08L 83/10* (2006.01)

(52) U.S. Cl.
  CPC .............. *C08G 77/50* (2013.01); *C08L 83/04* (2013.01); *C08L 83/10* (2013.01)

(56) References Cited

OTHER PUBLICATIONS

Written Opinion received in PCT/JP2019/018895, dated Aug. 13, 2019.
Honda and Toyota, "Photo-triggered solvent-free metamorphosis of polymeric materials", Sep. 11, 2017, p. 502, vol. 8, No. 1, Publisher: Nat Commun.
Safa, et al., "Synthesis of organosilyl compounds-containing 1,2,4,5-tetraaryl imidazoles sonocatalyzed by M/SAPO-34 (M = Fe, Co, Mn, and Cu) nanostructures", Aug. 1, 2015, pp. 883-890, vol. 18, No. 8, Publisher: Comptes Rendus Chimie.
Zhao, et al., "Study on nonlinear optical, dielectric and pyroelectric properties of novel organicinorganic hybrid material", Apr. 1, 2003, pp. 2116-2119, vol. 57, No. 13-14, Publisher: Materials Letters.
Zhao, et al., "Organic and inorganic hybrid film with second-order nonlinear optical and pyroelectric properties", Dec. 1, 2006, pp. 1748-1752, vol. 515, No. 4, Publisher: Thin Solid Films.
Akiyama and Yoshida, "*Photochemically reversible liquefaction and solidification of single compounds based on a sugar alcohol scaffold with multi azo-arms*", Apr. 10, 2012, pp. 2353-2356, vol. 24, No. 17, Publisher: Adv Mater.

\* cited by examiner

[FIG. 1]
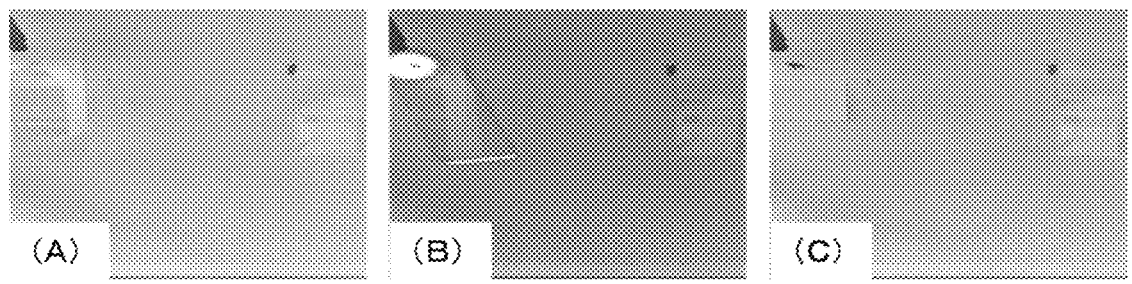
[FIG. 2]
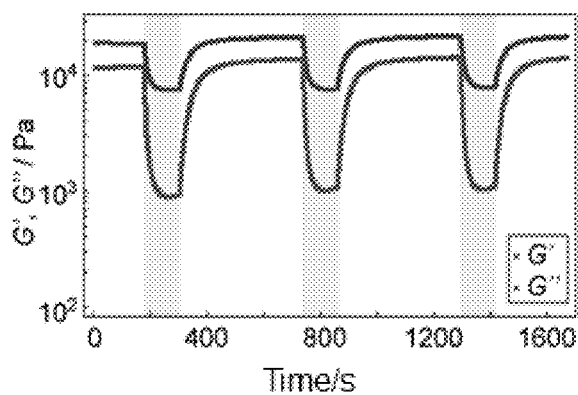
[FIG. 3]
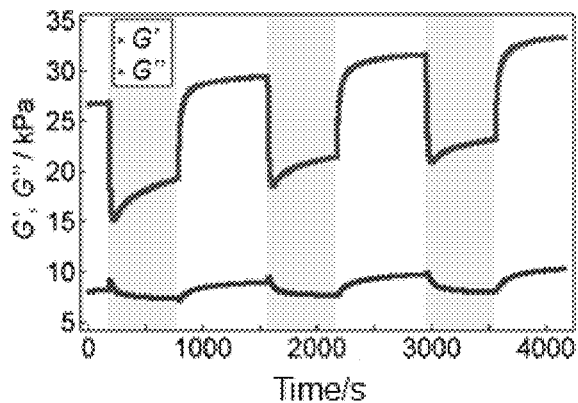

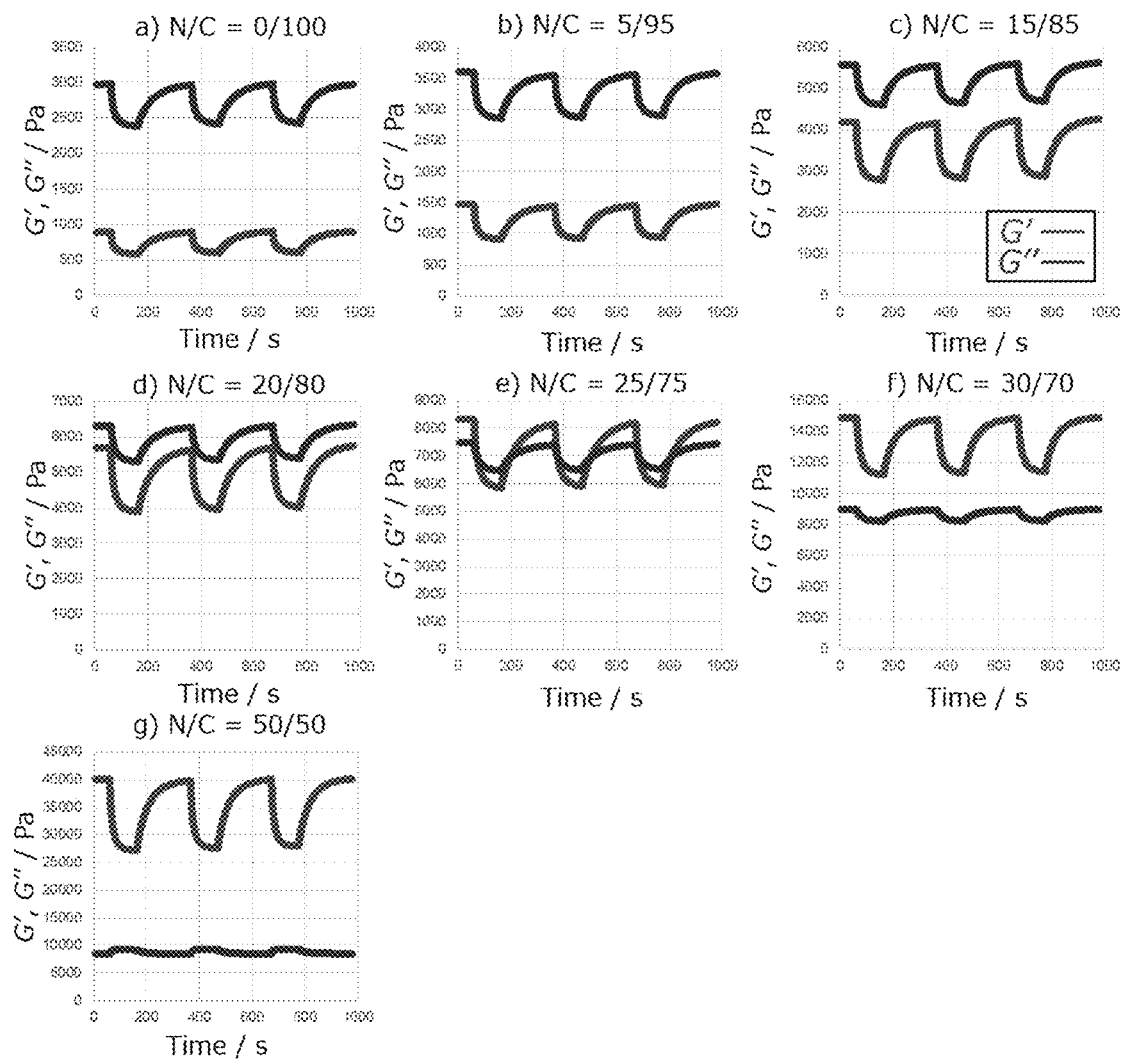
[FIG. 4]

POLYMER COMPOUND HAVING LOPHINE STRUCTURE

TECHNICAL FIELD

The present invention relates to a silicon-containing polymer compound having a lophine structure and a method of producing the same.

BACKGROUND ART

A substance that does not contain a solvent and whose flow/non-flow state can be controlled by an external stimulus at room temperature is expected to be applied to reusable resins and adhesives. As one of such attempts, an example using crystallization/melting of a low molecular weight compound by a light stimulus has been reported, and its application to adhesives and the like has been studied (for example, Patent Literature 1 and Non Patent Literature 1). However, a change in the flow state in Patent Literature 1 merely obtains the flow state by reducing crystallinity of regularly arranged molecules by the light stimulus. High strength and adhesiveness as a material cannot be expected, and a range of molecular structure design was limited. In the compounds of Patent Literature 1 and Non Patent Literature 1, a photoisomerization reaction of azobenzene is used. However, since fluidity is controlled through isomerization of azobenzene introduced into a side chain, there is little room for modification of the side chain, and applicable polymers are limited.

On the other hand, polysiloxanes such as silicone are silicon-containing polymer materials used for various purposes, from elastomers and greases to oils. The inventors of the present application are studying fluidization and non-fluidization by functionalizing such polysiloxanes (for example, Non Patent Literature 2). However, the conventional method has a problem that synthesis of the functionalized polysiloxane resin is complicated and a multi-step process is required. In addition, when a silyl ether bond (Si—O—C) is formed in a molecule for functionalized modification, the bond is easily cleaved by the presence of acid ($H^+$), $F^-$, etc., and there is also a problem that stability of a polysiloxane molecule is inferior. Thus, it has been desired to develop a functionalization method that simplifies a manufacturing process, can be easily applied to existing polysiloxane-based materials, and has excellent molecular stability.

CITATION LIST

Patent Literature

Patent Literature 1: JP 2011-256291 A

Non Patent Literature

Non Patent Literature 1: Adv. Mater., 2012, 24, 2353-2356
Non Patent Literature 2: Nat. Commun., 2017, 8, 502

SUMMARY OF INVENTION

Technical Problem

Thus, objects of the present invention are to provide a novel functional silicon-containing polymer compound to which a property capable of controlling fluidity by a light stimulus is imparted to a silicon-containing polymer such as polysiloxane and to provide a method capable of efficiently synthesizing such a polymer compound with a smaller number of steps while maintaining molecular stability.

Solution to Problem

As a result of diligent studies to solve the above problems, the present inventors have found that stability can be maintained by removing silyl ether from a silicon-containing polymer such as polysiloxane. The present inventors have further found that a lophine structure can be efficiently introduced into a side chain or an end of the silicon-containing polymer such as polysiloxane by using a hydrosilane-substituted arylimidazole compound. The present inventors have furthermore found that the silicon-containing polymers modified with the lophine moiety can be linked to each other intermolecularly by a covalent bond of the lophine moiety, and the viscoelasticity and fluid state of the polymer can be controlled by reversibly changing a molecular shape depending on the presence or absence of a light stimulus. Based on these findings, the present invention has been completed.

That is, in one aspect, the present invention provides:

<1> a polymer compound having: a backbone structure consisting of a silicon-containing polymer; and N number of partial structures represented by the following formula (1) at an end or side chain of the backbone structure, N being 2 or more:

[CHEM. 1]

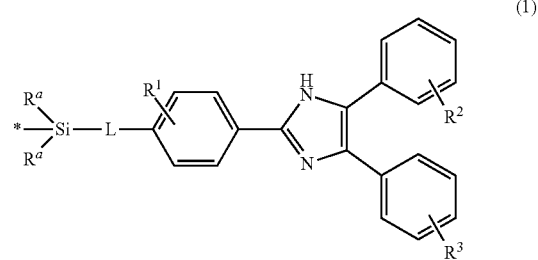

wherein * represents a linking point with the backbone structure; L is a direct bond, a silicon-containing spacer group, a siloxane chain, or a $C_1$-$C_5$ alkylene group; $R^a$ is independently a $C_1$-$C_5$ alkyl group; $R^1$ is 1 to 4 substituents, which are the same or different, independently selected from the group consisting of a halogen atom, a nitro group, and an alkyl group, an alkenyl group, an aryl group, a sulfo group, a carboxy group, an ester group, a thioester group, a dithioester group, a carbonate group, a thiocarbonate group, a dithiocarbonate group, a trithiocarbonate group, a carbamate group, a thiocarbamate group, a dithiocarbamate group, an ether group, a hydroxy group, a thiol group, a sulfide group, a disulfide group, a silyl group, an amino group, or an amide group, each of which is optionally substituted; and $R^2$ and $R^3$ are each 1 to 5 substituents, which are the same or different, independently selected from the group consisting of a halogen atom, a nitro group, and an alkyl group, an alkenyl group, an aryl group, a sulfo group, a carboxy group, an ester group, a thioester group, a dithioester group, a carbonate group, a thiocarbonate group, a dithiocarbonate group, a trithiocarbonate group, a carbamate group, a thiocarbamate group, a dithiocarbamate group, an ether group, a hydroxy group, a thiol group, a sulfide group, a disulfide group, a silyl group, an amino group, or an amide group, each of which is optionally substituted;

<2> the polymer compound according to <1> above, wherein the silicon-containing polymer is polysiloxane;

<3> the polymer compound according to <1> above, wherein the silicon-containing polymer is a silicon-containing polymer having a three-armed star-like structure;

<4> the polymer compound according to any one of <1> to <3> above, wherein N is 2 to 20000;

<5> the polymer compound according to any one of <1> to <4> above, wherein the partial structure represented by the formula (1) is present at one or more ends in the backbone structure; and <6> the polymer compound according to any one of <1> to <5> above, wherein the partial structure represented by the formula (1) is present at all ends in the backbone structure.

In another embodiment, the present invention also relates to a multimeric compound having a structure in which the above polymer compounds are linked to each other intermolecularly and a composition containing the multimeric compound. That is, the present invention provides:

<7> a multimeric compound in which a plurality of the polymer compounds according to any one of <1> to <6> above are linked to each other, the multimeric compound having a structure that forms an intermolecular bond by a covalent bond via a hexaaryl-biimidazole (HABI) group generated by reaction between lophine groups present in the partial structure of the formula (1) comprised in each of the polymer compounds, wherein the intermolecular bond is reversibly cleaved by an external light stimulus or an external mechanical stimulus;

<8> the multimeric compound according to <7> above, wherein the light stimulus is irradiation with ultraviolet light;

<9> a composition including the multimeric compound according to <7> or <8> above;

<10> the composition according to <9> above, further including a silicon-containing polymer having a cyclic structure;

<11> the composition according to <10> above, wherein the silicon-containing polymer having the cyclic structure has HABI groups in a molecule; and <12> the composition according to any one of <9> to <11> above, selected from the group consisting of adhesives, pressure-sensitive adhesives, and viscosity modifiers.

In another aspect, the present invention also relates to a method of reversibly controlling the viscoelasticity and fluidity of a polymer material by using state changes of the polymer compound and the multimeric compound. That is, the present invention provides:

<13> a method of reversibly controlling fluidity of a polymer material, the method including
a step of applying a light stimulus to a polymer material including the multimeric compound according to <7> above to cleave an intermolecular bond via the HABI groups and producing a monomer compound having a triphenylimidazolyl radical;

<14> the method according to <13> above, wherein the light stimulus is irradiation with ultraviolet light; and <15> the method according to <13> or <14> above, further including a step of stopping the light stimulus or mechanical stimulus to form the intermolecular bond via the HABI groups again and returning to the multimeric compound.

In a further embodiment, the present invention also relates to a method of producing the above-mentioned polymer compound and a hydrosilane-substituted arylimidazole compound used as an initiator in the production method. That is, the present invention provides:

<16> a method of producing a polymer compound having a backbone structure consisting of a silicon-containing polymer and having a partial structure represented by the following formula (1) at an end or side chain of the backbone structure:

[CHEM. 2]

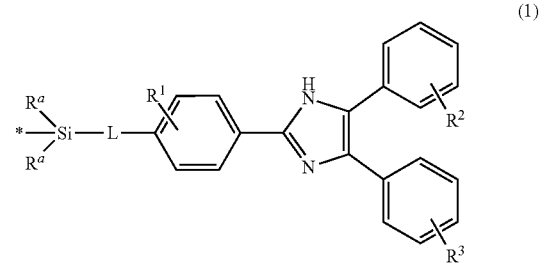

wherein * represents a linking point with the backbone structure; L is a direct bond, a silicon-containing spacer group or a $C_1$-$C_5$ alkylene group; $R^a$ is independently a $C_1$-$C_5$ alkyl group; $R^1$ is 1 to 4 substituents, which are the same or different, independently selected from the group consisting of a hydrogen atom, a halogen atom, a nitro group, and an alkyl group, an alkenyl group, an aryl group, a sulfo group, a carboxy group, an ester group, a thioester group, a dithioester group, a carbonate group, a thiocarbonate group, a dithiocarbonate group, a trithiocarbonate group, a carbamate group, a thiocarbamate group, a dithiocarbamate group, an ether group, a hydroxy group, a thiol group, a sulfide group, a disulfide group, a silyl group, an amino group, or an amide group, each of which is optionally substituted; and $R^2$ and $R^3$ are each 1 to 5 substituents, which are the same or different, independently selected from the group consisting of a hydrogen atom, a halogen atom, a nitro group, and an alkyl group, an alkenyl group, an aryl group, a sulfo group, a carboxy group, an ester group, a thioester group, a dithioester group, a carbonate group, a thiocarbonate group, a dithiocarbonate group, a trithiocarbonate group, a carbamate group, a thiocarbamate group, a dithiocarbamate group, an ether group, a hydroxy group, a thiol group, a sulfide group, a disulfide group, a silyl group, an amino group, or an amide group, each of which is optionally substituted, the production method including a step of reacting a silicon-containing polymer having a vinyl group with a hydrosilane-substituted arylimidazole compound represented by the following formula (2) to obtain the polymer compound:

[CHEM. 3]

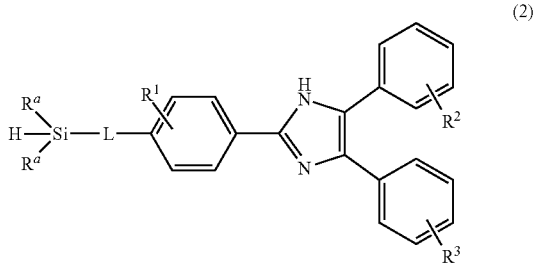
(2)

wherein L, $R^a$, $R^1$, $R^2$ and $R^3$ have the same definition as the formula (1);

<17> the production method according to <16> above, wherein the reaction is carried out in the presence of a transition metal catalyst;

<18> the production method according to <17> above, wherein the transition metal catalyst is a platinum complex;

<19> the production method according to <16> to <18> above, wherein the silicon-containing polymer is polysiloxane;

<20> the production method according to <16> to <18> above, wherein the silicon-containing polymer is a silicon-containing polymer having a three-armed starlike structure; and <21> a hydrosilane-substituted arylimidazole compound represented by the following formula (2):

[CHEM. 4]

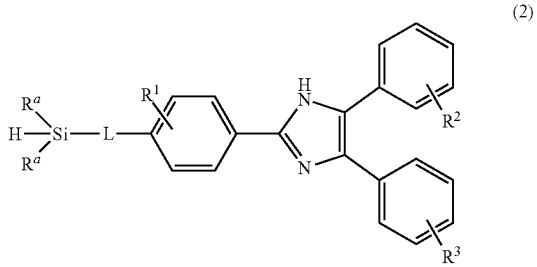
(2)

wherein L is a direct bond, a silicon-containing spacer group or a $C_1$-$C_5$ alkylene group; $R^a$ is independently a $C_1$-$C_5$ alkyl group; $R^1$ is 1 to 4 substituents, which are the same or different, independently selected from the group consisting of a hydrogen atom, a halogen atom, a nitro group, and an alkyl group, an alkenyl group, an aryl group, a sulfo group, a carboxy group, an ester group, a thioester group, a dithioester group, a carbonate group, a thiocarbonate group, a dithiocarbonate group, a trithiocarbonate group, a carbamate group, a thiocarbamate group, a dithiocarbamate group, an ether group, a hydroxy group, a thiol group, a sulfide group, a disulfide group, a silyl group, an amino group, or an amide group, each of which is optionally substituted; and $R^2$ and $R^3$ are each 1 to 5 substituents, which are the same or different, independently selected from the group consisting of a hydrogen atom, a halogen atom, a nitro group, and an alkyl group, an alkenyl group, an aryl group, a sulfo group, a carboxy group, an ester group, a thioester group, a dithioester group, a carbonate group, a thiocarbonate group, a dithiocarbonate group, a trithiocarbonate group, a carbamate group, a thiocarbamate group, a dithiocarbamate group, an ether group, a hydroxy group, a thiol group, a sulfide group, a disulfide group, a silyl group, an amino group, or an amide group, each of which is optionally substituted.

Advantageous Effects of Invention

The present invention can provide a novel functional silicon-containing polymer compound in which the lophine structure is efficiently and stably introduced into the side chain or the end of the silicon-containing polymer such as polysiloxane and to which a property capable of controlling the fluidity by the light stimulus is imparted. With such functionalization, it is possible to dissociate/reform a covalent bond only by turning on and off a light stimulus, so that it has an advantage that it is not necessary to change a wavelength range of emitted light when the fluidity is controlled as in a conventional technique using an intramolecular photoisomerization reaction.

The production method of the present invention can be used for hydrosilylation of existing silicon-containing polymer materials such as polysiloxane, and a functionalized functional group such as a lophine structure can be imparted by a simple one-step reaction and without including an unstable silyl ether bond (Si—O—C). In addition, by a subsequent mild oxidation reaction, a multimeric compound in which such a polymer compound is linked intermolecularly can be obtained. Since molecular weights of the polymer compounds, which are precursors of the obtained multimeric compounds, are uniform, large changes in physical properties such as viscosity can be brought about by breaking and regenerating the linkage.

By using the polymer material of the present invention as an adhesive, an adhesive, a viscosity modifier, or a molding material, the molecular weight can be changed by an external light stimulus, and physical properties such as adhesiveness, tackiness, and moldability can be reversibly controlled at a desired timing.

BRIEF DESCRIPTION OF DRAWINGS

FIG. 1 is an image showing results of observing changes in tackiness associated with light irradiation using a multimeric compound of the present invention in which a plurality of PDMSs are linked via HABI groups, which is obtained in Example 6-2.

FIG. 2 is a graph showing a change in storage modulus (G') and loss modulus (G") associated with repetition of light irradiation on/off for the multimeric compound of the present invention in which the plurality of PDMSs are linked via HABI groups, which is obtained in Example 4-2.

FIG. 3 is a graph showing a change in storage modulus (G') and loss modulus (G") associated with repetition of light irradiation on/off for the multimeric compound of the present invention in which the plurality of PDMSs are linked via HABI groups, which is obtained in Example 6-2.

FIG. 4 is a graph showing a change in storage modulus (G') and loss modulus (G") associated with repetition of light irradiation on/off for a total of seven types of mixtures in which a mixing ratio of a reticulated multimeric compound (N) obtained in Example 12 and a cyclic PDMS (C) obtained in Example 4-2 is in a range of N/C=[0/100] to [50/50] in a weight ratio.

DESCRIPTION OF EMBODIMENTS

Hereinafter, embodiments of the present invention will be described. The scope of the present invention is not intended to be restrained by these descriptions, and embodiments other than the following examples can also be appropriately modified and carried out to the extent that the purport of the present invention is not impaired.

1. Definition

In the present specification, "alkyl or alkyl group" may be an aliphatic hydrocarbon group in a linear, branched, or cyclic configuration, or any combination thereof. The number of carbon atoms in the alkyl group is not particularly restricted, but is, for example, 1-20 ($C_{1-20}$), 1-15 ($C_{1-15}$), or 1-10 ($C_{1-10}$). In the present specification, an alkyl group may have one or more optional substituents. For example, $C_{1-8}$ alkyls include methyl, ethyl, n-propyl, isopropyl, n-butyl, isobutyl, sec-butyl, tert-butyl, n-pentyl, isopentyl, neo-pentyl, n-hexyl, isohexyl, n-heptyl, n-octyl, and the like. Examples of the substituents include alkoxy groups, halogen atoms (which may be any one of a fluorine atom, a chlorine atom, a bromine atom, or an iodine atom), amino groups, mono- or di-substituted amino groups, substituted silyl groups, and acyl groups, but the substituents are not limited thereto. When an alkyl group has two or more substituents, those substituents may be the same or different. Similarly, alkyl moieties of other substituents including the alkyl moieties (for example, an alkyloxy group, and an aralkyl group) may be the same or different.

In the present specification, "alkylene" is a divalent group composed of a linear or branched saturated hydrocarbon. Examples include methylene, 1-methylmethylene, 1,1-dimethylmethylene, ethylene, 1-methylethylene, 1-ethylethylene, 1,1-dimethylethylene, 1,2-dimethylethylene, 1,1-diethylethylene, 1,2-diethylethylene, 1-ethyl-2-methylethylene, trimethylene, 1-methyltrimethylene, 2-methyltrimethylene, 1,1-dimethyltrimethylene, 1,2-dimethyltrimethylene, 2,2-dimethyltrimethylene, 1-ethyltrimethylene, 2-ethyltrimethylene, 1,1-diethyltrimethylene, 1,2-diethyltrimethylene, 2,2-diethyltrimethylene, 2-ethyl-2-methyltrimethylene, tetramethylene, 1-methyltetramethylene, 2-methyltetramethylene, 1,1-dimethyltetramethylene, 1,2-dimethyltetramethylene, 2,2-dimethyltetramethylene, 2,2-di-n-propyltrimethylene, and the like.

In the present specification, when certain functional groups are defined as "optionally substituted," the type of substituent, substitution position, and number of substituents are not particularly restricted. When there are two or more substituents, they may be the same or different. Examples of substituents include, but are not limited to, an alkyl group, alkoxy group, hydroxyl group, carboxyl group, halogen atom, sulfo group, amino group, alkoxycarbonyl group, oxo group, or the like. Other substituents may be present in these substituents. Examples of such cases include, but are not limited to, an alkyl halide group or the like.

In the present specification, "alkenyl" means a linear or branched hydrocarbon group having at least one carbon-carbon double bond. Examples include vinyl, allyl, 1-propenyl, isopropenyl, 1-butenyl, 2-butenyl, 3-butenyl, 1,3-butanedienyl, 1-pentenyl, 2-pentenyl, 3-pentenyl, 4-pentenyl, 1,3-pentanedienyl, 1-hexenyl, 2-hexenyl, 3-hexenyl, 4-hexenyl, 5-hexenyl, and 1,4-hexanedienyl). The double bond may have either a cis conformation or trans conformation.

In the present specification, "aryl or aryl group" may be either a monocyclic or fused polycyclic aromatic hydrocarbon group, or may include one or more hetero atoms (for example, an oxygen atom, nitrogen atom, or sulfur atom) as ring constituent atoms. In this case, it is also sometimes called "heteroaryl" or "heteroaromatic." When an aryl is monocyclic or a fused ring, the aryl can bond at all possible positions. In the present specification, an aryl group may have one or more optional substituents on its ring. Examples of substituents include, but are not limited to, an alkoxy group, halogen atom, amino group, mono- or di-substituted amino group, substituted silyl group, acyl group, or the like. When an aryl group has two or more substituents, they may be the same or different. Similarly, aryl moieties of other substituents including the aryl moieties (for example, an aryloxy group, and an arylalkyl group) may be the same or different.

The term "amide or amide group" used in the present specification includes both RNR'CO— (when R=alkyl, alkylaminocarbonyl-) and RCONR'— (when R=alkyl, alkylcarbonylamino-).

The term "ester or ester group" used in the present specification includes both ROCO— (when R=alkyl, alkoxycarbonyl-) and RCOO— (when R=alkyl, alkylcarbonyloxy-).

In the present specification, "silicon-containing spacer group" means a spacer including a bond formed by a substituent containing a Si atom, and refers to, for example, a chain including a siloxane bond or a silmethylene bond.

2. Lophine-Modified Polymer Compound

The polymer compound of the present invention has a backbone structure consisting of a silicon-containing polymer, and has a partial structure containing a lophine group represented by the following formula (1) at the end or side chain of the backbone structure. That is, it is characterized in that the lophine group is introduced into the backbone structure by a Si-carbon bond. Here, the "lophine group" means a 2,4,5-triphenylimidazole group, and groups having an optional substituent on each benzene ring thereof are also included therein.

[CHEM. 5]

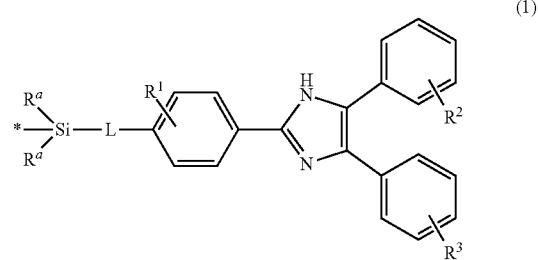

(1)

In the formula (1), * represents a linking point with the backbone structure, and can be connected to the end or side chain of the backbone structure as described above. N number of partial structures of the formula (1) can be introduced into the backbone structure via the linking point. In order to obtain a multimeric structure described later by bonding the partial structure of the formula (1), it is desirable that there are a plurality of the partial structures. Specifically, N is 2 or more, preferably 2 to 20000, and more preferably 2 to 15000 or 2 to 2000, for example.

Similarly, in the formula (1), L is a direct bond, a silicon-containing spacer group or a $C_1$-$C_5$ alkylene group, and is preferably a direct bond. The silicon-containing spacer group can be, for example, a divalent group having one or more siloxane bonds or silmethylene bonds. $R^a$ is independently a $C_1$-$C_5$ alkyl group, preferably a methyl group. All of $R^a$ is preferably a methyl group.

$R^1$ is 1 to 4 substituents, which are the same or different, independently selected from the group consisting of a hydrogen atom, a halogen atom, a nitro group, and an alkyl group, an alkenyl group, an aryl group, a sulfo group, a carboxy group, an ester group, a thioester group, a dithioester group, a carbonate group, a thiocarbonate group, a dithiocarbonate group, a trithiocarbonate group, a carbamate group, a thiocarbamate group, a dithiocarbamate group, an ether group, a hydroxy group, a thiol group, a sulfide group, a disulfide group, a silyl group, an amino group, or an amide group, each of which is optionally substituted. As long as the bonding between the lophine groups for multimerization described later is not hindered, all of $R^1$ can preferably be a hydrogen atom (that is, can be unsubstituted), but is not particularly limited.

$R^2$ and $R^3$ are each 1 to 5 substituents, which are the same or different, independently selected from the group consisting of a hydrogen atom, a halogen atom, a nitro group, and an alkyl group, an alkenyl group, an aryl group, a sulfo group, a carboxy group, an ester group, a thioester group, a dithioester group, a carbonate group, a thiocarbonate group, a dithiocarbonate group, a trithiocarbonate group, a carbamate group, a thiocarbamate group, a dithiocarbamate group, an ether group, a hydroxy group, a thiol group, a sulfide group, a disulfide group, a silyl group, an amino group, or an amide group, each of which is optionally substituted. Although both $R^2$ and $R^3$ can preferably be hydrogen atoms (that is, can be unsubstituted), $R^2$ is also not particularly limited as long as the bonding between the lophine groups for multimerization described later is not hindered.

In a particularly preferred embodiment, L is a direct bond; all of $R^a$ are methyl groups; and $R^1$, $R^2$ and $R^3$ are all hydrogen atoms.

The "silicon-containing polymer" forming the backbone structure means a backbone structure containing a repeating unit obtained by polymerizing a monomer containing a Si atom in the molecule. Therefore, the structure may be a structure in which a plurality of different monomers containing a Si atom in the molecule are polymerized. The silicon-containing polymer may be a copolymer containing an additional monomer other than the monomer containing a Si atom in the molecule. The silicon-containing polymer forming the backbone structure is preferably polysiloxane, polysilmethylene, polycarbosilane, or polycarbosilazane. Examples include polydimethylsiloxane (PDMS), polymethylhydrosiloxane (PMHS) and the like. The backbone structure may be not only a linear structure but also a structure having a branched structure. For example, a silicon-containing polymer having a three-armed star-like structure or a four-armed four-armed star-like structure can be used. For example, polysiloxane having a three-armed star-like structure or a four-armed star-like structure can be used.

As will be described later, since the partial structure of the formula (1) is introduced by reaction with a vinyl group on the silicon-containing polymer, the monomer containing the Si atom in the molecule is preferably a monomer having a vinyl group.

The partial structure of the formula (1) is preferably present at one or more ends in the backbone structure, and more preferably at all ends in the backbone structure. For example, in the case of polysiloxane having a three-armed star-like structure, a lophine group can be introduced at the end of each of the three-armed chains. Even in such a case, the partial structure can be present at any position in the side chain of the backbone structure in addition to those ends. The number of partial structures of the formula (1) introduced can be changed according to desired physical properties in the polymer compound and the like.

Non-limiting specific examples of the polymer compound having the partial structure represented by the formula (1) in the present invention include the following polysiloxane compound having the partial structure represented by the formula (1) at both ends of a linear backbone structure (in any of the formulas, n is 2 to 20000, preferably 2 to 2000).

[CHEM. 6]

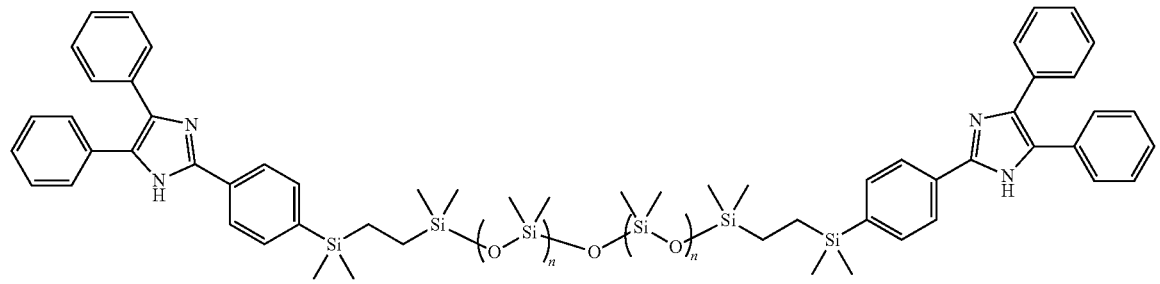

[CHEM. 7]

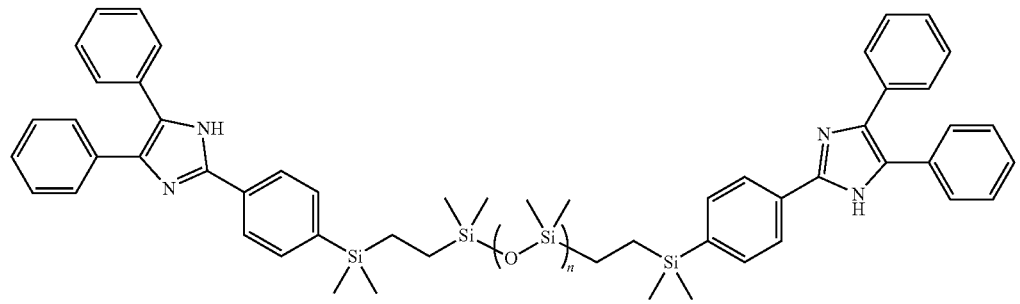

Specific examples in which the partial structure represented by the formula (1) is introduced at an end of a backbone structure of polysiloxane having a three-armed star-like structure include the following polysiloxane compound (in the formula, n is 2 to 20000, preferably 2 to 2000). When trifunctional silanol is used as an initiator, polysiloxane having a three-armed star-like structure that does not contain an unstable silyl ether bond (Si—O—C) can be obtained.

[CHEM. 8]

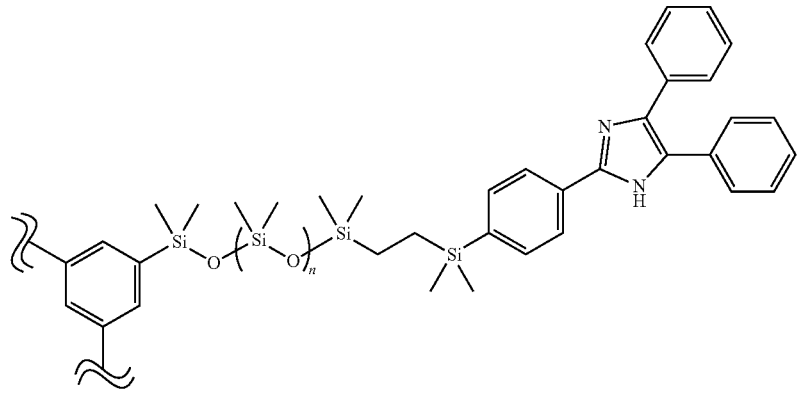

Although all three armed chains in the formula have the same structure, it is not always necessary to have the partial structure represented by the formula (1) at the ends of all the branched chains. The length of the branched chain, that is, the value of n does not necessarily have to be the same in each branched chain, and may be different.

Specific examples in which the partial structure represented by the formula (1) is introduced at an end of a backbone structure of polysiloxane having a four-armed four-armed star-like structure include the following polysiloxane compound (in the formula, n is 2 to 20000, preferably 2 to 2000).

[CHEM. 9]

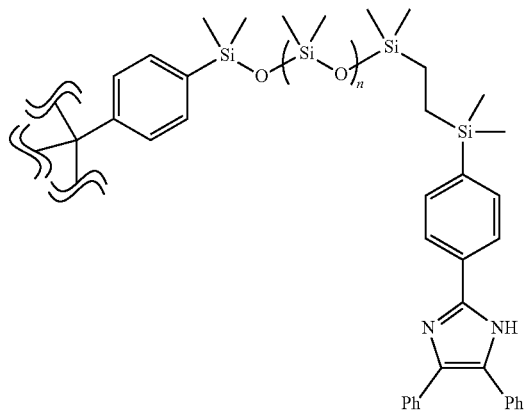

Although all four-armed chains in the formula have the same structure, it is not always necessary to have the partial structure represented by the formula (1) at the ends of all the branched chains. The length of the branched chain, that is, the value of n does not necessarily have to be the same in each branched chain, and may be different.

3. Method of Producing Lophine-Modified Polymer Compound

The lophine-modified polymer compound having the partial structure represented by the above formula (1) can be obtained in one step by reaction of a silicon-containing polymer having a vinyl group with a hydrosilane-substituted arylimidazole compound represented by the following formula (2).

[CHEM. 10]

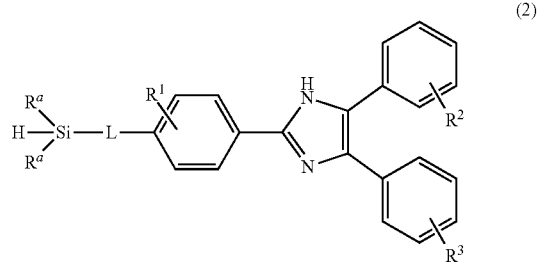

(In the formula, L, $R^a$, $R^1$, $R^2$ and $R^3$ have the same definition as the above formula (1).)

The lophine structure, which is a functionalized functional group, etc. can be introduced by reacting the Si—H moiety in the hydrosilane-substituted arylimidazole compound represented by the formula (2) with the vinyl group on the silicon-containing polymer.

The reaction can be carried out in the presence of a transition metal catalyst, which is preferably a platinum complex. Typically, a 1,3-divinyl-1,1,3,3-tetramethyldisiloxane platinum (0) complex, also referred to as a Karstedt catalyst, is preferred.

As described above, the silicon-containing polymer having a vinyl group is a polymer having a structure consisting of a repeating unit obtained by polymerizing a monomer containing a Si atom in the molecule. The structure may be a structure in which a plurality of different monomers containing a Si atom in the molecule are polymerized. The silicon-containing polymer may be a copolymer containing an additional monomer other than the monomer containing a Si atom in the molecule. The vinyl group in the silicon-containing polymer can be present at any position of the repeating unit, preferably at the end.

The silicon-containing polymer having a vinyl group is preferably polysiloxane, and commercially available polysiloxane can be used as such polysiloxane. For example, polydimethylsiloxane (PDMS) and various modified silicones can be used. The silicon-containing polymer may have not only a linear structure but also a structure having a branched structure. For example, polysiloxane having a three-armed star-like structure or a four-armed four-armed star-like structure can be used.

Such a silicon-containing polymer preferably has a molecular weight (number average molecular weight) in a range of 1,000 to 1,000,000, more preferably in a range of 3,000 to 100,000.

Non-limiting specific examples of the hydrosilane-substituted arylimidazole compound represented by the formula (2) include the following compounds.

[CHEM. 11]

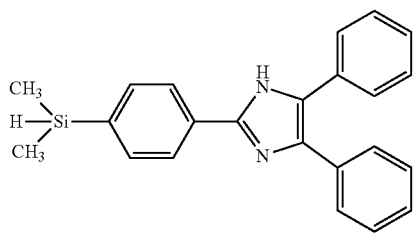

The hydrosilane-substituted arylimidazole compound can be synthesized from an inexpensive raw material using a known reaction, as shown in Examples of the present application. Specifically, the hydrosilane-substituted arylimidazole compound can be obtained by synthesizing an arylimidazole halide compound and hydrosilylating the arylimidazole halide compound.

4. Control of Multimeric Compound and Fluidity

The present invention also relates to a multimeric compound in which a plurality of lophine-modified polymer compounds having the partial structure represented by the above formula (1) are linked to each other. The multimeric compound has a structure (crosslinked structure in a broad sense) in which a lophine group in the lophine-modified polymer compound is reacted with another lophine group to form a hexaarylbiimidazole (HABI) group, and the hexaarylbiimidazole group is intermolecularly bonded by a covalent bond. By forming a multimer intermolecularly linked via the HABI groups by reaction between the lophine-modified polymer compounds, a polymer compound having different properties such as viscoelasticity with increased molecular weight can be obtained.

Then, it is characterized in that by applying a light stimulus or mechanical stimulus to the multimeric compound, the linkage (covalent bond) in the HABI groups is cleaved, the intermolecular linkage is dissolved, and a polymer compound of a monomer having a triphenylimidazolyl radical (TPIR) is produced. In addition, when the light stimulus or the mechanical stimulus is stopped and the multimeric compound is left at room temperature, the linkage can be spontaneously formed again, and the compound can be returned to the multimeric compound linked via the HABI groups. By using such a reaction, fluidity of a crosslinked polymer can be reversibly controlled by an external stimulus such as a light stimulus or mechanical stimulus.

The reaction for obtaining, from the lophine-modified polymer compound having the partial structure represented by the above formula (1), the multimeric compound in which the plurality of lophine-modified polymer compounds are linked to each other via the HABI groups is allowed to proceed under normal conditions in the art. However, the reaction is preferably carried out in the presence of a base such as sodium hydroxide, potassium hydroxide or calcium hydroxide, and an oxidizing agent such as potassium ferricyanide.

As a reaction mechanism for such reversible control, a non-limiting example in the case of a lophine-modified polymer compound having three-armed polysiloxane as a backbone structure and a multimer thereof is shown below.

[CHEM. 12]

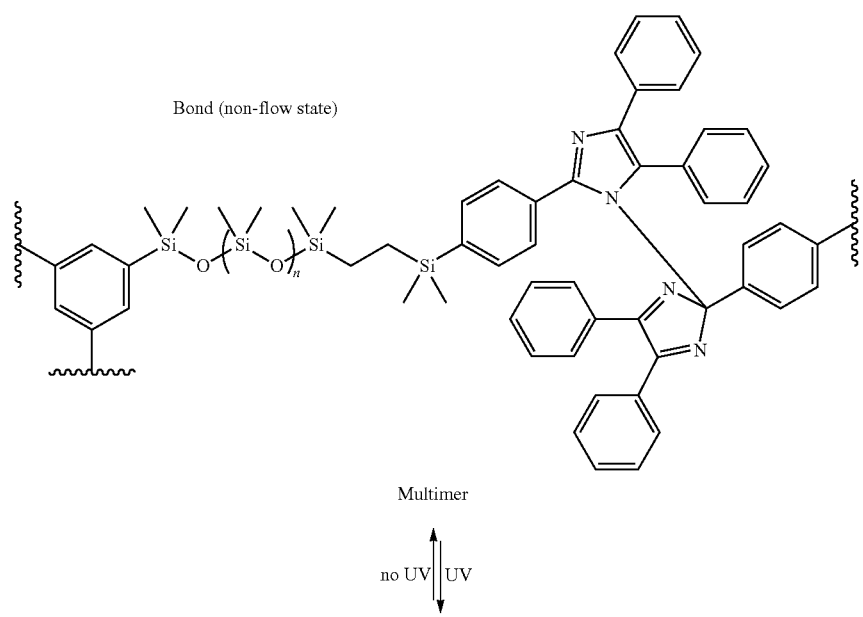

-continued

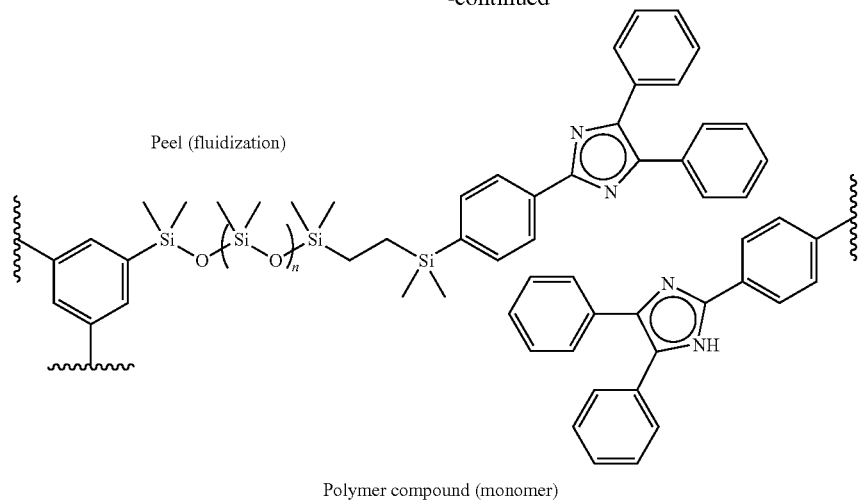

Peel (fluidization)

Polymer compound (monomer)

When the three-armed polysiloxane is a multimer intermolecularly linked via its HABI groups, the molecular weight is large. Since the polysiloxane is reticulated, it is in a non-flow state. By irradiation with ultraviolet light (UV) or the like, the linkage via the HABI groups is dissolved, and a TPIR group is generated and changes to a monomer having low viscoelasticity. In addition, when the irradiation with ultraviolet light or the like is stopped, the monomer returns to a multimer intermolecularly linked via the original HABI groups.

Therefore, in a further embodiment, the present invention also relates to a method of reversibly controlling fluidity of a polymer material by using the reaction of bond formation and cleavage by a light stimulus in the above-mentioned polymer compound (monomer) and the multimeric compound. More specifically, such a method is characterized by including a step of applying a light stimulus or mechanical stimulus to a polymer material including the above-mentioned multimeric compound to cleave the intermolecular bond via the HABI groups and thereby producing a monomer compound having the TPIR group.

Ultraviolet light and visible light can be used for the light stimulus, and ultraviolet light is preferably used. The wavelength range of ultraviolet light is 10 to 400 nm, preferably 200 to 400 nm, and more preferably 315 to 400 nm. It is preferable to apply the light stimulus under a temperature condition of −20 to 100° C. As the physical stimulus, a mechanical stimulus capable of applying a shearing force sufficient to cut a polymer backbone can be used, and ultrasonic waves are preferably used.

The method of the present invention can further include a step of stopping the light stimulus and the physical stimulus to form an intermolecular bond via the HABI groups again and returning the compound to a multimeric compound. In this step, when the light stimulus or the physical stimulus is stopped and the compound is left at room temperature, the HABI groups in which the TPIR group is bonded intermolecularly is spontaneously formed again, and the compound can be returned to the multimeric compound in the non-flow state. By repeating these steps, the fluidity of the multimeric compound can be reversibly controlled.

In another aspect, in the present invention, it has been found that since a composition is obtained by further mixing a silicon-containing polymer having a cyclic structure with a multimeric compound in which a plurality of lophine-modified polymer compounds having the partial structure represented by the above formula (1) are linked to each other, the viscoelasticity and photoresponsiveness can be controlled. It is considered that this is because, due to the presence of a cyclic polymer in the reticulated multimeric compound, the density of the network changes, and as a result, viscoelastic properties typified by a storage modulus (G') and a loss modulus (G") change. This provides an advantage that desired viscoelastic properties can be obtained simply by mixing a specific ratio of cyclic polymer without synthesizing a lophine-modified polymer compound having a predetermined structure each time.

As the silicon-containing polymer having a cyclic structure, one synthesized from commercially available polydimethylsiloxane or the like can be used. Preferably, the silicon-containing polymer has HABI groups in the molecule and forms a cyclic structure by using the HABI groups as a linking group. More preferably, the silicon-containing polymer having a cyclic structure can use a multimeric compound in which a linear polymer compound cyclically links the partial structures represented by the above formula (1) via the HABI groups. Although a ratio of a reticulated multimeric compound (N) consisting of the lophine-modified polymer compound having the partial structure represented by the above formula (1) to a silicon-containing polymer (C) having a cyclic structure can be appropriately changed according to desired viscoelastic properties, the ratio is preferably in a range of N/C=[0/100] to [50/50] in a weight ratio.

3. Applications

In one embodiment, the present invention also relates to a composition including the above-mentioned multimeric compound. Such a composition can be applied in a wide range of applications as long as the property of controlling fluidity by a light stimulus is beneficial. For example, the composition can be a composition selected from the group consisting of adhesives, pressure-sensitive adhesives, and viscosity modifiers. For adhesive and pressure-sensitive adhesive applications, the composition has an advantage of being able to remotely control adhesion and peeling by an external stimulus such as a light stimulus. The composition also has an advantage of being applicable to adhesion in an environment where heating is not desirable or to adhesion of materials having low heat resistance. As the viscosity modifier, the viscosity can be adjusted to a desired viscosity by remotely modifying the molecular weight by an external stimulus such as a light stimulus, and the modified compound can be reused, so that the composition has an advantage of being able to provide a high-performance viscosity modifier excellent in environmental friendliness.

EXAMPLES

Hereinafter, the present invention will be described in more detail with reference to Examples, but the present invention is not limited by these Examples.

Example 1: Synthesis of Hydrosilane-Substituted Arylimidazole Compound

By the following reaction, a hydrosilane-substituted arylimidazole compound used for introducing a lophine structure into a silicon-containing polymer was synthesized.

Synthesis of 2-(4-bromophenyl)-4,5-diphenyl-1H-imidazole

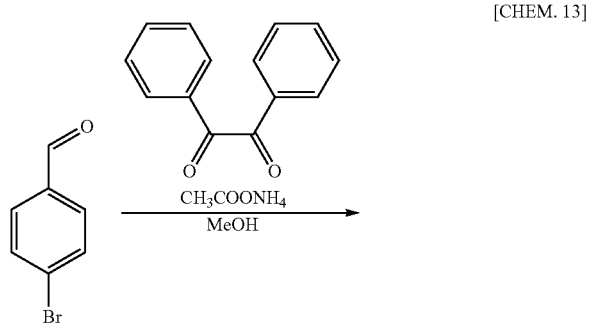

[CHEM. 13]

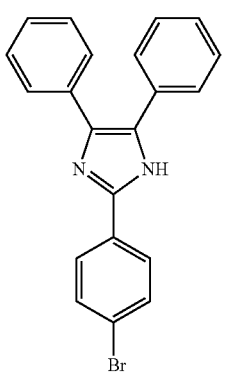

4-Bromobenzenealdehyde (37 g), benzyl (42 g), ammonium acetate (31 g), and methanol (200 mL) were added to a reaction vessel and refluxed at 80° C. for 18 hours. After cooling to room temperature, the reaction mixture was filtered, and the filtered crystalline product was washed with methanol and collected. The filtrate was concentrated and then filtered again, and the filtered crystalline product was washed with methanol and collected. The obtained crystalline products were combined and dried under reduced pressure to obtain 62 g of white crystal. As a result of analysis by 1H-NMR, it was confirmed that the product was 2-(4-bromophenyl)-4,5-diphenyl-1H-imidazole.

Synthesis of 2-(4-(dimethylsilyl)phenyl)-4,5-diphenyl-1H-imidazole

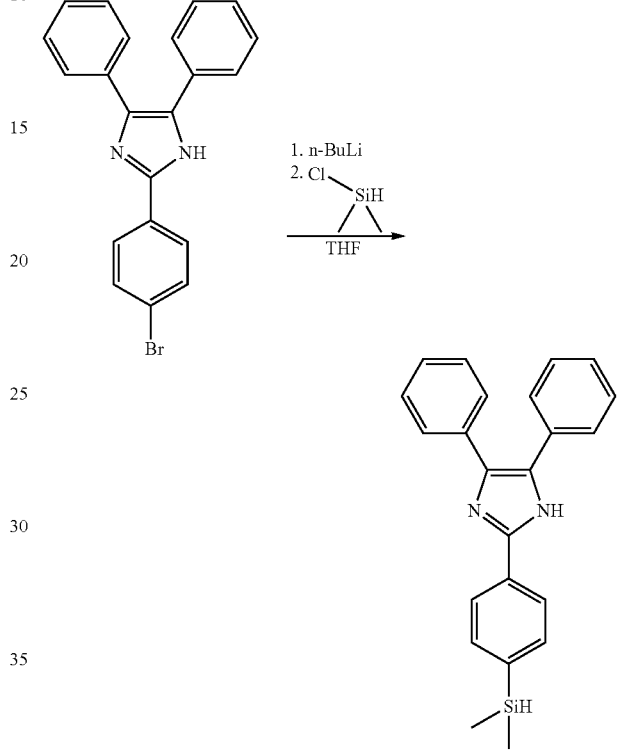

[CHEM. 14]

2-(4-Bromophenyl)-4,5-diphenyl-1H-imidazole (20 g) and tetrahydrofuran (230 mL) were added to a reaction vessel and dissolved, and the reaction vessel was cooled to −80° C. n-Butyllithium (2.3M, cyclohexane solution) (58 mL) was slowly added to this reaction solution. After stirring for 80 minutes, chlorodimethylsilane (6.5 mL) was added, the reaction vessel was returned to room temperature, and stirring was continued for another 7 hours. The reaction was stopped by adding saturated aqueous sodium hydrogen carbonate solution (100 mL) to the reaction vessel, and the organic phase was washed with the saturated aqueous sodium hydrogen carbonate solution and water, and dried over magnesium sulfate. The filtrate was collected by filtration, and tetrahydrofuran was distilled off under reduced pressure to obtain 15 g of a white powder. As a result of analysis by 1H-NMR, it was confirmed that the product was 2-(4-(dimethylsilyl)phenyl)-4,5-diphenyl-1H-imidazole.

Example 2: Synthesis of Vinyl Group-Containing Linear Polydimethylsiloxane

Vinyl group-containing polydimethylsiloxane (PDMS) was synthesized by the following reaction.

[CHEM. 15]

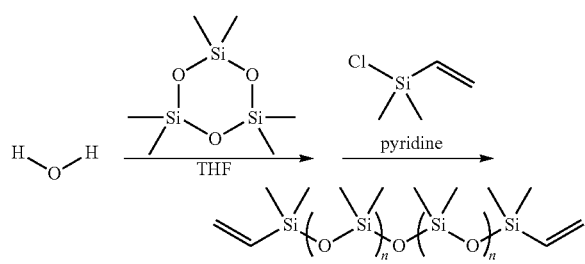

After hexamethylcyclotrisiloxane (11.1 g) and tetrahydrofuran (9 mL) were added to the reaction vessel and mixed, a tetrahydrofuran solution (1 mL) of 1,5,7-triazabicyclo[4.4.0]deca-5-ene (100 mg) and water (90 μL) was quickly mixed in this reaction vessel and stirred at room temperature for 70 minutes. Then, pyridine (6.1 mL) and chlorodimethylvinylsilane (6.8 mL) were added in this order, and the mixture was further stirred for 1 hour. Hexane (100 mL) was added to the reaction mixture, washed with water and then dried over magnesium sulfate. A crude oily product obtained by distilling off a volatile component under reduced pressure was dissolved in acetone and cooled to −40° C. to cause phase separation. An oil phase obtained by removing an acetone phase was dried under reduced pressure to obtain 4.45 g of a colorless oily compound. As a result of analysis by 1H-NMR, it was found that the product was a linear PDMS containing vinyl group at both ends, which had the above structure.

Example 3-1: Synthesis Example 1 of Lophine-Modified PDMS

Polydimethylsiloxane with a lophine structure introduced at the end was synthesized by the following reaction.

[CHEM. 16]

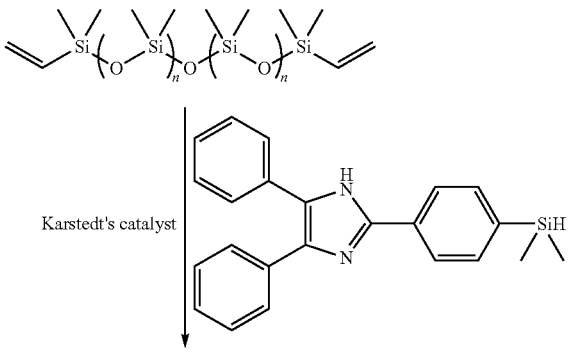

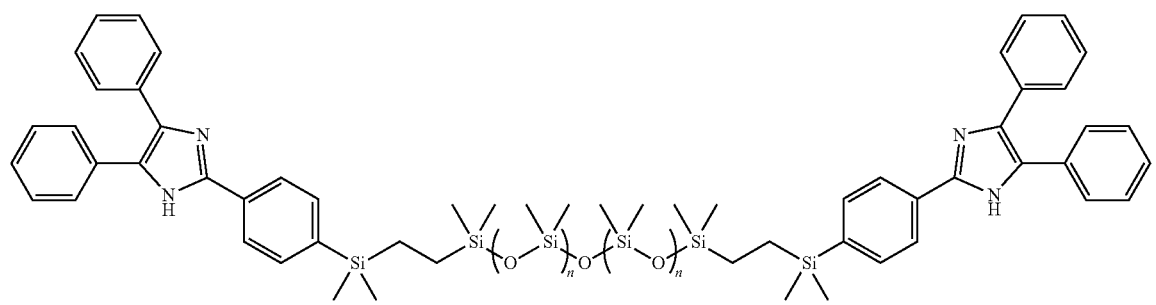

The linear PDMS with vinyl end groups (2.46 g) obtained in Example 2, 2-(4-(dimethylsilyl)phenyl)-4,5-diphenyl-1H-imidazole (2.62 g) obtained in Example 1, tetrahydrofuran (10 mL) and a xylene solution (100 μL) of a platinum (0)-1,3-divinyl-1,1,3,3-tetramethyldisiloxane complex were added and stirred at 80° C. for 5 hours. After distilling off tetrahydrofuran under reduced pressure, methanol was added to remove a methanol phase. The remaining oil phase was washed with methanol and then dried under reduced pressure to obtain 2.83 g of a film-like solid. As a result of analysis by 1H-NMR, it was confirmed that the product was a linear PDMS containing lophine group at both ends.

Example 3-2: Synthesis Example 1 of PDMS Multimer

By the following reaction, a multimer of the lophine-modified PDMS obtained in Example 3-1 was synthesized.

Sodium hydroxide (500 mg) and an aqueous solution (20 mL) of potassium ferricyanide (2.93 g) were added to a hexane solution (20 mL) of linear PDMS with lophine end groups (800 mg) obtained in Example 3-1 and stirred vigorously at room temperature for 90 minutes. The organic layer of the reaction mixture was washed with water, dried over magnesium sulfate, and filtered. Then, the filtrate was dried under reduced pressure to give 660 mg of a highly viscous oily compound. As a result of analysis by 1H-NMR, it was found that the product was a multimeric compound having the above structure in which a plurality of PDMSs were linked via HABI groups.

Example 4-1: Synthesis Example 2 of Lophine-Modified PDMS

By the following reaction, it was confirmed that a lophine structure could be introduced at the end in one step using commercially available modified silicone.

[CHEM. 17]

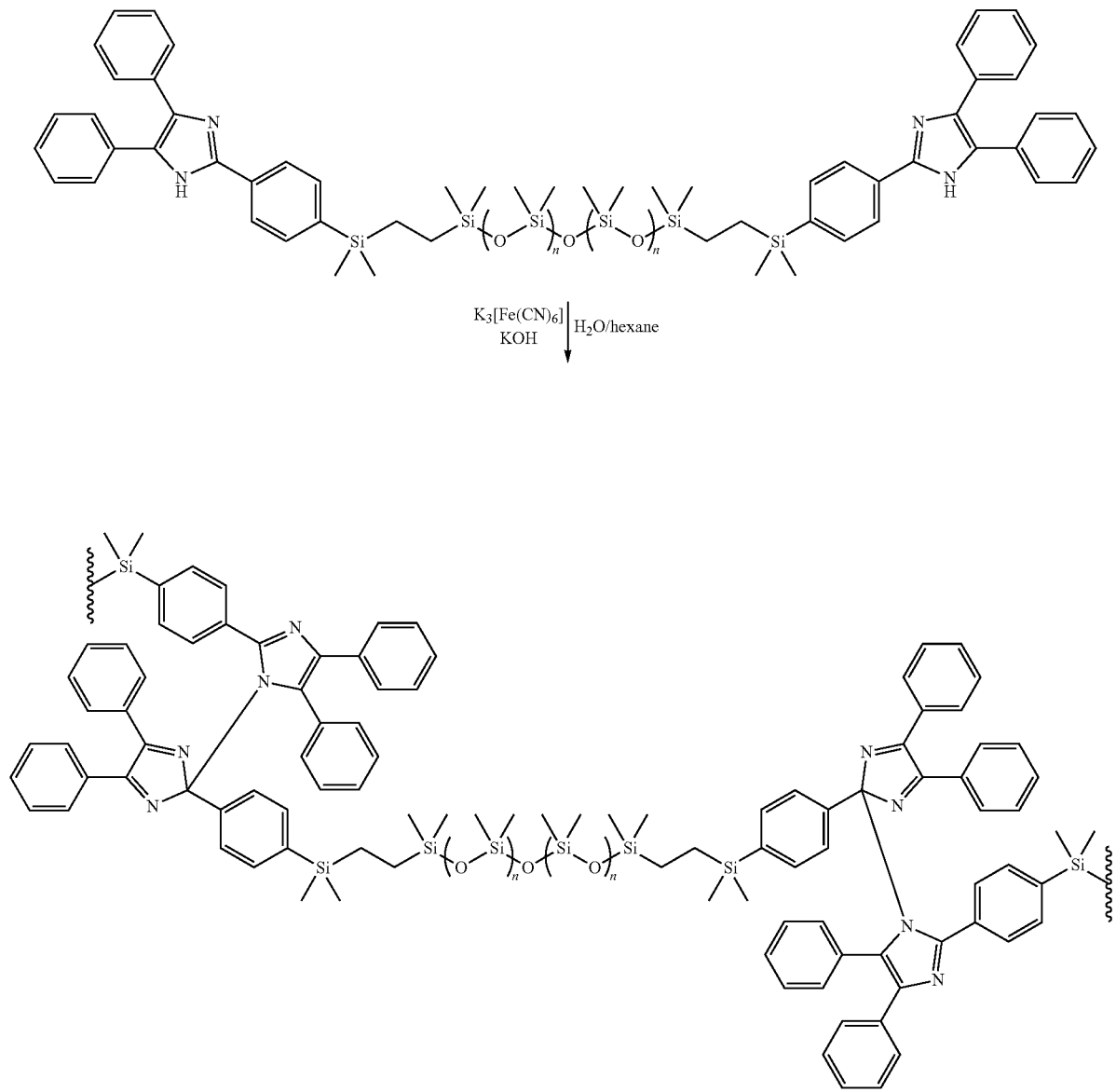

[CHEM. 18]

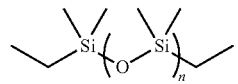
CAS: 68083-19-2

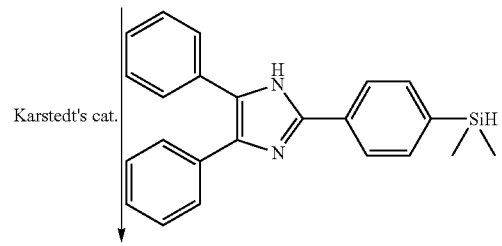

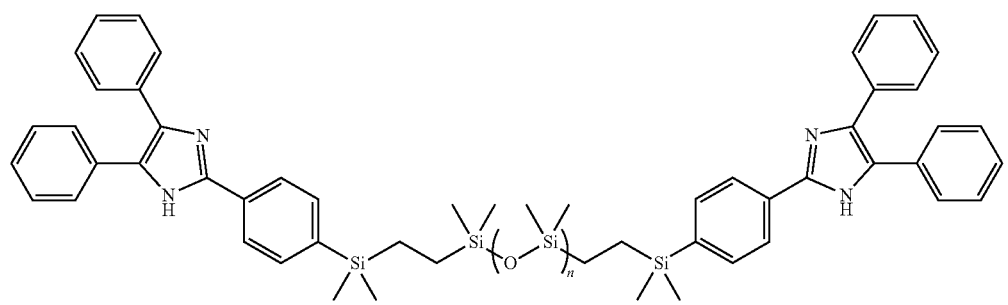

Commercially available linear PDMS with vinyl end groups (5.0 g, produced by Aldrich, CAS No. 68083-19-2), 2-(4-(dimethylsilyl)phenyl)-4,5-diphenyl-1H-imidazole (750 mg) obtained in Example 1, tetrahydrofuran (20 mL) and a xylene solution (50 μL) of a platinum (0)-1,3-divinyl-1,1,3,3-tetramethyldisiloxane complex were added and stirred at 80° C. for 19 hours. After distilling off tetrahydrofuran under reduced pressure, acetone was added to remove an acetone phase. The remaining oil phase was washed with acetone and then dried under reduced pressure to obtain 4.75 g of an oily liquid. As a result of analysis by 1H-NMR, it was confirmed that the product was a linear PDMS containing lophine group at both ends, which had the above structure.

Example 4-2: Synthesis Example 2 of PDMS Multimer

By the following reaction, a multimer of the lophine-modified PDMS obtained in Example 4-1 was synthesized.

[CHEM. 19]

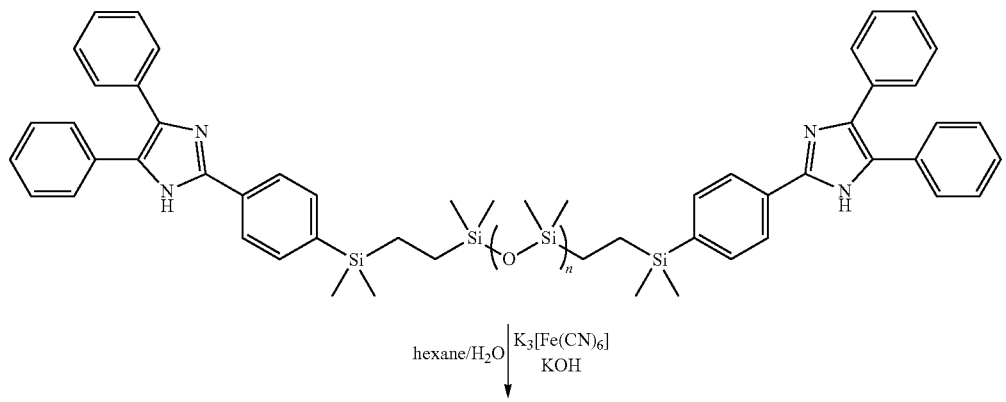

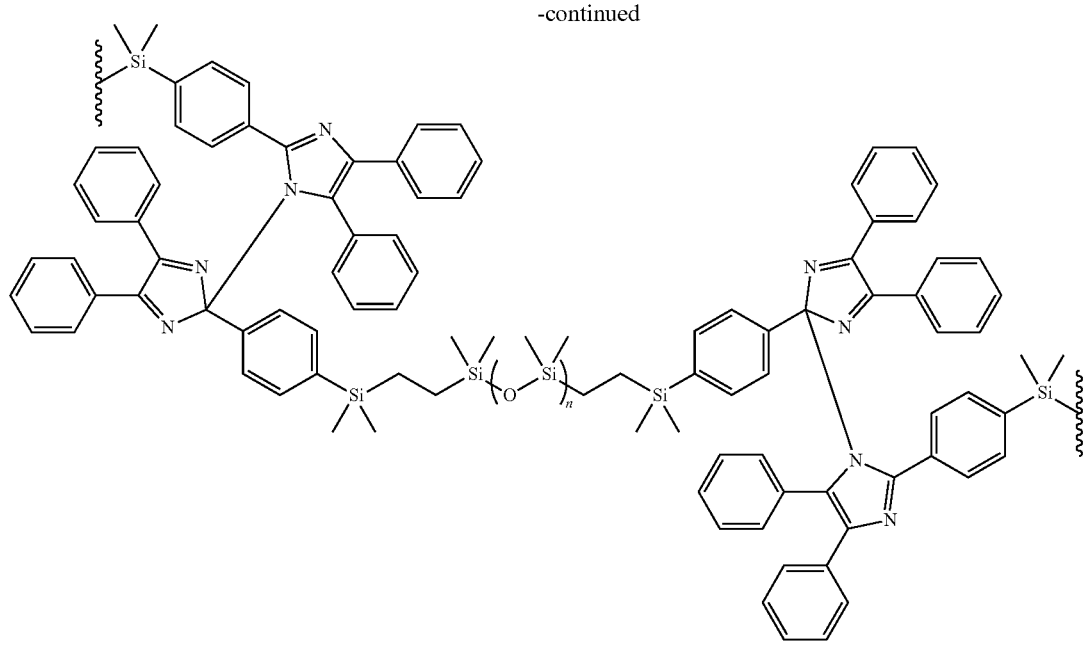

Sodium hydroxide (500 mg) and an aqueous solution (10 mL) of potassium ferricyanide (2.93 g) were added to a hexane solution (20 mL) of linear PDMS with lophine end groups (2.1 g) obtained in Example 4-1 and stirred vigorously at room temperature for 60 minutes. The organic layer of the reaction mixture was washed with water, dried over magnesium sulfate, and filtered. Then, the filtrate was dried under reduced pressure to give 1.83 g of a highly viscous oily compound. As a result of analysis by 1H-NMR, it was confirmed that the product was a multimeric compound having the above structure in which a plurality of PDMSs were linked via HABI groups.

Example 5: Synthesis of Vinyl Group-Containing Three-Armed Polydimethylsiloxane Vinyl group-containing three-armed polydimethylsiloxane (PDMS) was synthesized by the following reaction.

[CHEM. 20]

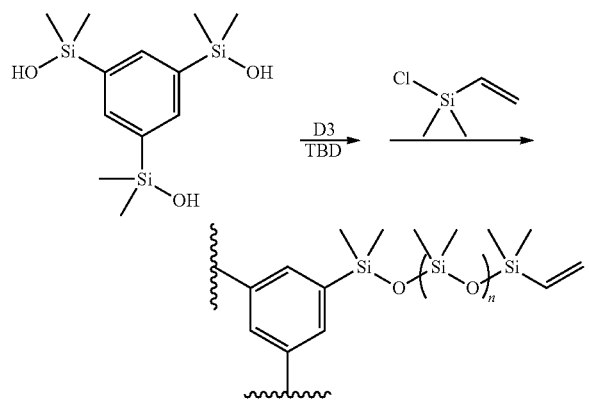

Hexamethylcyclotrisiloxane (11.1 g) and tetrahydrofuran (20 mL) were placed in a reaction vessel and mixed, and the mixture was quickly mixed with a tetrahydrofuran solution (3 mL) of 1,3,5-tris(dimethylhydroxysilyl)benzene (300 mg) and 1,5,7-triazabicyclo[4.4.0]deca-5-ene (100 mg). After stirring at room temperature for 80 minutes, pyridine (3.6 mL) and chlorodimethylvinylsilane (4.1 mL) were added in this order, and the mixture was further stirred for 30 minutes. Hexane (100 mL) was added to the reaction mixture and washed with water, and then an organic phase was dried over magnesium sulfate. A crude oily product obtained by distilling off a volatile component under reduced pressure was washed with acetone and then dried under reduced pressure to obtain 7.85 g of a colorless oily compound. As a result of analysis by 1H-NMR, it was confirmed that the product was a three-armed PDMS having the above structure.

Example 6-1: Synthesis Example of Three-Armed PDMS Modified with Lophine Group A compound in which the lophine structure was introduced at the end of three-armed polydimethylsiloxane was synthesized by the following reaction.

[CHEM. 21]

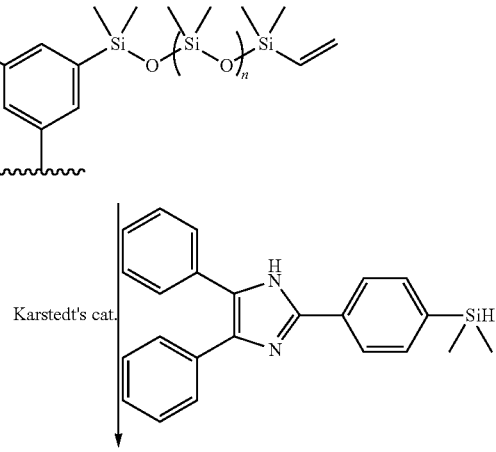

-continued

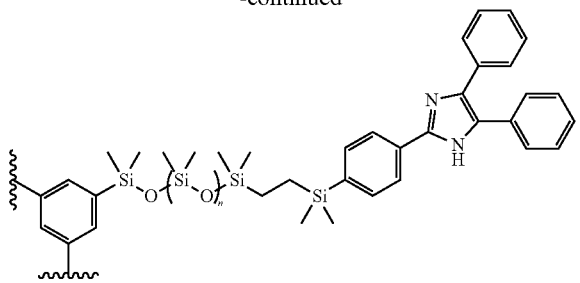

The three-armed PDMS with vinyl end groups (5.0 g) obtained in Example 5, 2-(4-(dimethylsilyl)phenyl)-4,5-diphenyl-1H-imidazole (2.86 g) obtained in Example 1, tetrahydrofuran (20 mL) and a xylene solution (100 μL) of a platinum (0)-1,3-divinyl-1,1,3,3-tetramethyldisiloxane complex were added and stirred at 80° C. for 15 hours. Tetrahydrofuran was distilled off under reduced pressure, then washed with methanol, and dried under reduced pressure to obtain 4.17 g of an oily liquid. As a result of analysis by 1H-NMR, it was confirmed that the product was a three-armed PDMS having lophine end groups, which had the above structure.

Example 6-2: Synthesis Example of Three-Armed PDMS Multimer

By the following reaction, a multimer of the three-armed PDMS modified with a lophine group, which was obtained in Example 6-1, was synthesized.

[CHEM. 22]

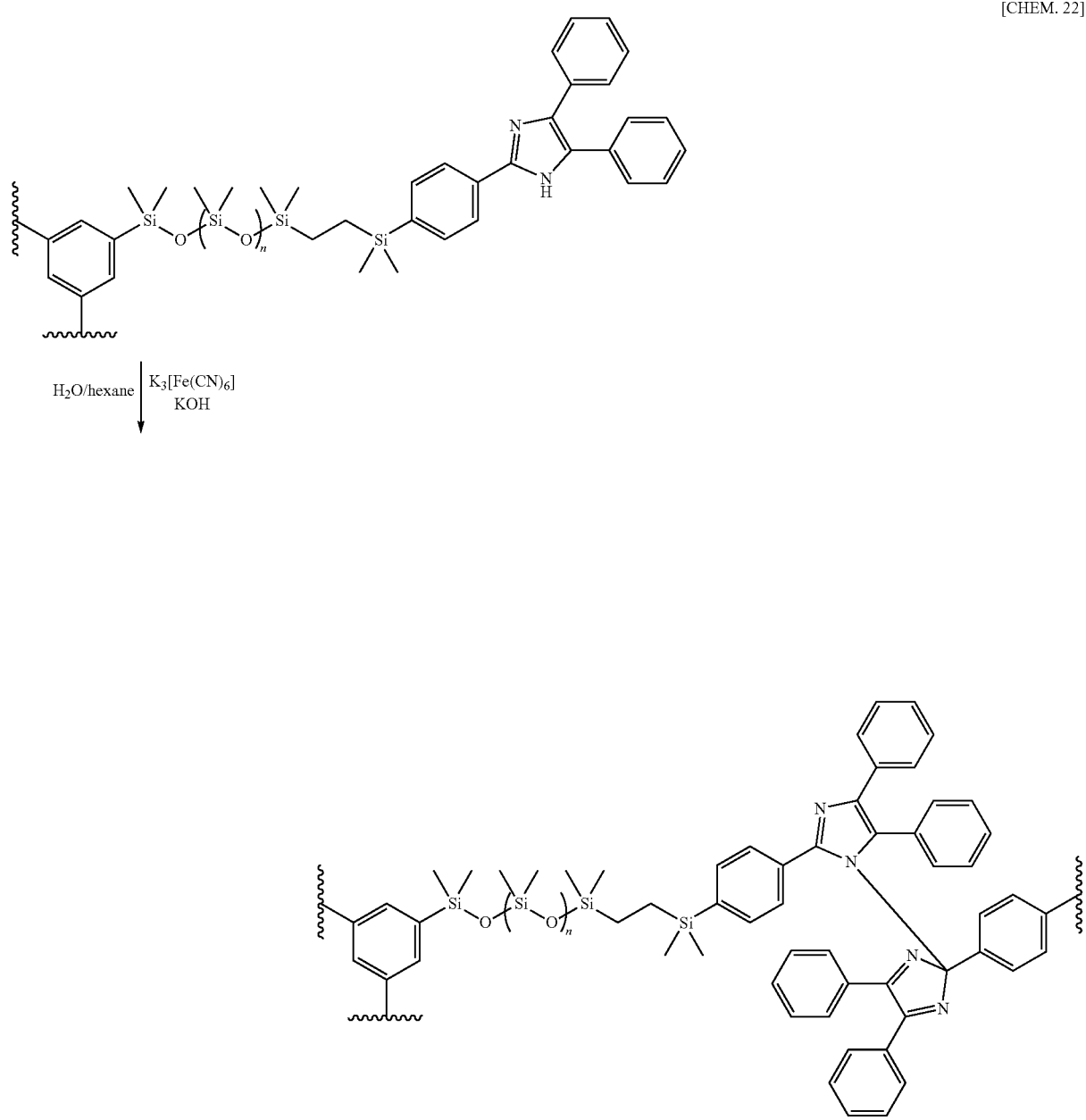

Sodium hydroxide (500 mg) and an aqueous solution (10 mL) of potassium ferricyanide (2.93 g) were added to a hexane/tetrahydrofuran solution (40 mL/5 mL) of the three-armed PDMS (1.5 g) modified with a lophine group, which was obtained in Example 6-1, and the mixture was stirred vigorously at room temperature for 2 hours. The organic layer of the reaction mixture was washed with water, dried over magnesium sulfate, and filtered. Then, the filtrate was dried under reduced pressure to give 1.22 g of a film-like solid. As a result of analysis by 1H-NMR, it was confirmed that the product was a reticulated multimeric compound in which the plurality of PDMSs were linked via HABI groups having the above structure.

Example 7: Control of Tackiness

A change in tackiness associated with light irradiation was observed using a reticulated multimeric compound in which the plurality of PDMSs were linked via the HABI groups, which was obtained in Example 6-2. The results are illustrated in FIG. 1.

A reticulated multimeric compound (about 5 mg) in which the plurality of PDMSs were linked via the HABI groups, which was obtained in Example 6-2, was sandwiched between a paper and a slide glass, and the back side of the paper was fixed to the wall. Due to the tackiness of the reticulated multimeric compound, the slide glass was fixed to the wall for a sufficient time without falling (FIG. 1A). Subsequently, an adhering portion was irradiated with UV (365 nm). As a result, the slide glass began to peel off immediately (FIG. 1B) and completely peeled off within tens of seconds (FIG. 1C). From these facts, it was confirmed that the tackiness of the reticulated multimeric compound in which the plurality of PDMSs were linked via the HABI groups was controlled by light irradiation.

Example 8: Control of Fluidity

A change in fluidity associated with repetition of light irradiation on/off was observed with a rheometer by using the multimeric compound in which the plurality of PDMSS were linked via the HABI groups, which was obtained in Example 4-2. The results are illustrated in FIG. 2.

For the multimeric compound in which the plurality of PDMSs were linked via the HABI groups, which was obtained in Example 4-2, a change in the storage modulus (G') and the loss modulus (G") associated with light irradiation was measured. First, it was found that G" was larger than G' under both light irradiation (shaded part of FIG. 2) and non-light irradiation (unshaded part of FIG. 2), and the multimeric compound in which the plurality of PDMSs were linked via the HABI groups had fluid properties. Subsequently, both G' and G" decreased sharply with light irradiation, and in particular, G' decreased to about ⅒ of the original value. When the light irradiation on/off were repeated, a series of changes in G' and G" were repeated reversibly. In addition, it was found that the decrease in G' and G" associated with light irradiation was completed within 2 minutes, and the increase in G' and G" due to the stoppage of light irradiation was completed within 4 minutes. From these facts, it was confirmed that the fluidity of the multimeric compound in which the plurality of PDMSs were linked via the HABI groups could be controlled by light irradiation.

Example 9: Control of Viscoelasticity

A change in viscoelasticity associated with repetition of light irradiation on/off was observed with a rheometer by using the reticulated multimeric compound in which the plurality of PDMSs were linked via the HABI groups, which was obtained in Example 6-2. The results are illustrated in FIG. 2.

The change in G' and G" associated with light irradiation was observed using the reticulated multimeric compound in which the plurality of PDMSs were linked via the HABI groups, which was obtained in Example 6-2. First, it was found that G' was larger than G" under both light irradiation (shaded part of FIG. 3) and non-light irradiation (unshaded part of FIG. 3), and the multimeric compound in which the plurality of PDMSs were linked via the HABI groups had properties as a non-fluid solid. Subsequently, both G' and G" decreased with light irradiation and increased when light irradiation was stopped. When the light irradiation on/off were repeated, a series of changes in G' and G" were repeated reversibly. In addition, it was found that the decrease in G' and G" associated with light irradiation was completed within 2 minutes, and the decrease and increase in G' and G" due to the stoppage of light irradiation were almost completed within 2 minutes. From these facts, it was confirmed that the viscoelasticity of the multimeric compound in which the plurality of PDMSs were linked via the HABI groups could be controlled by light irradiation.

Example 10: Synthesis of Four-Armed Star-Like PDMS with Vinyl End Groups

Vinyl group-containing four-armed PDMS was synthesized by the following reaction.

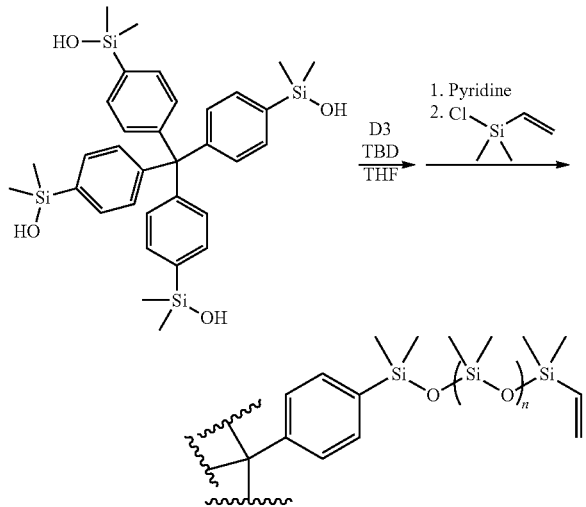

[CHEM. 23]

Hexamethylcyclotrisiloxane (3.0 g) and tetrahydrofuran (6 mL) were placed in a reaction vessel and mixed, and the mixture was quickly mixed with a tetrahydrofuran solution (8 mL) of (methanetetrayltetrakis)benzene-4,1-diyl))tetrakis (dimethylsilanol) (48 mg) and 1,5,7-triazabicyclo[4.4.0] deca-5-ene (22 mg). After stirring at room temperature for 80 minutes, pyridine (0.76 mL) and chlorodimethylvinylsilane (0.42 mL) were added in this order, and the mixture was further stirred overnight. Hexane (100 mL) was added to the reaction mixture and washed with water, and then an organic phase was dried over sodium sulfate. A crude oily product obtained by distilling off a volatile component under reduced pressure was washed with acetone and then dried under reduced pressure to obtain 1.66 g of a colorless oily compound. As a result of analysis by 1H-NMR, it was confirmed that the product was a four-armed PDMS having the above structure.

Example 11: Synthesis Example of Four-Armed Armed Star-Like PDMS with Lophine End Groups A compound in which the lophine structure was introduced at the end of four-armed star-like PDMS with vinyl end groups was synthesized by the following reaction.

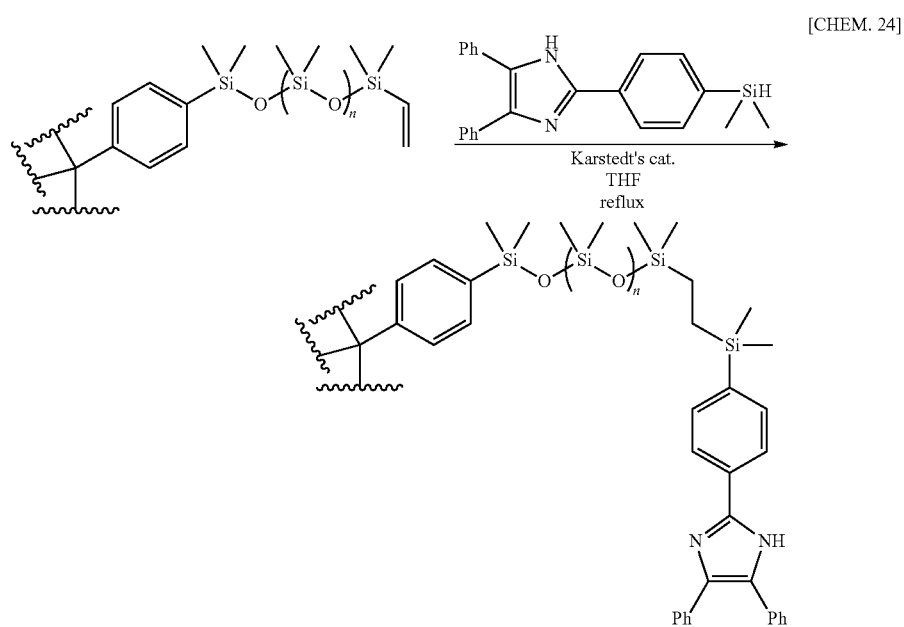

The four-armed star-like PDMS with vinyl end groups (1.6 g) obtained in Example 10, 2-(4-(dimethylsilyl)phenyl)-4,5-diphenyl-1H-imidazole (990 mg) obtained in Example 1, tetrahydrofuran (10 mL) and a xylene solution (100 μL) of a platinum (0)-1,3-divinyl-1,1,3,3-tetramethyldisiloxane complex were added and stirred at 80° C. overnight. Tetrahydrofuran was distilled off under reduced pressure, then washed with methanol and acetone, and dried under reduced pressure to obtain 1.12 g of an oily liquid. As a result of analysis by 1H-NMR, it was confirmed that the product was a four-armed star-like PDMS with lophine end groups, which had the above structure.

Example 12: Synthesis Example of Four-Armed PDMS Multimer

By the following reaction, a multimer of the four-armed star-like PDMS with lophine end groups obtained in Example 11 was synthesized.

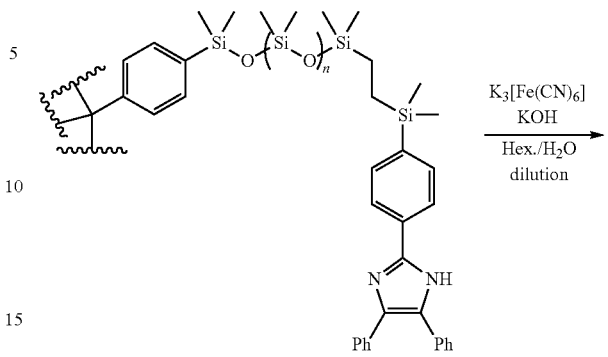

-continued

Potassium hydroxide (561 mg) and an aqueous solution (50 mL) of potassium ferricyanide (3.29 g) were added to a hexane/tetrahydrofuran solution (50 mL/5 mL) of the four-armed star-like PDMS with lophine end groups (1.0 g) obtained in Example 11, and the mixture was stirred vigorously at room temperature for 2 hours. The organic layer of the reaction mixture was washed with water, dried over sodium sulfate, and filtered. Then, the filtrate was dried under reduced pressure to give about 1 g of a film-like solid. As a result of analysis by 1H-NMR, it was confirmed that the product was a reticulated multimeric compound in which the plurality of PDMSs were linked via HABI groups having the above structure.

Example 13: Control of Viscoelasticity by Mixing Reticulated Multimeric Compound Synthesized Based on Four-Armed Star-Like PDMS Having Lophine End Groups, with Cyclic PDMS A multimeric compound (cyclic PDMS) synthesized from linear PDMS with lophine end groups in Example 4-2 was added to a reticulated multimeric compound synthesized from four-armed star-like PDMS with lophine end groups in Example 12 to obtain a mixture, and for the mixture, a change in viscoelasticity associated with light irradiation was observed. Here, a total of seven types of mixtures in which the mixing ratio of the reticulated multimeric compound (N) and the cyclic PDMS (C) was in a range of N/C=[0/100] to [50/50] in a weight ratio were measured. FIG. 4 shows measurement results of the change in G' and G" associated with light irradiation.

The viscoelasticity and its photoresponsiveness were both changed by changing the mixing ratio of the reticulated multimeric compound of Example 12 and the cyclic PDMS in the mixture. When the ratio of the cyclic PDMS was 75% (N/C=25/75), a magnitude relationship between the storage modulus and the loss modulus was repeatedly replaced by light irradiation. This means that the liquid state and the solid state can be changed repeatedly. From these facts, it has been found that the viscoelasticity and its photoresponsiveness of the reticulated multimeric compound in which the plurality of PDMSs are linked via the HABI groups can be controlled by mixing heterologous branching forms.

The invention claimed is:

1. A polymer compound comprising: a backbone structure consisting of a silicon-containing polymer; and N number of partial structures represented by the following formula (1) at an end or side chain of the backbone structure, N being 2 or more:

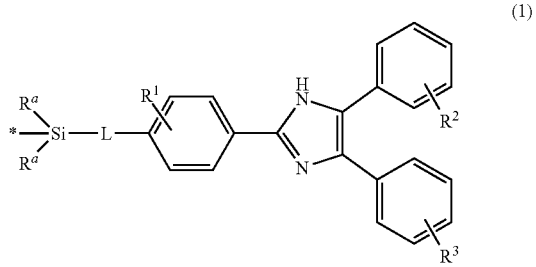

(1)

wherein * represents a linking point with the backbone structure; L is a direct bond, a silicon-containing spacer group or a $C_1$-$C_5$ alkylene group; $R^a$ is independently a $C_1$-$C_5$ alkyl group; $R^1$ is 4 substituents, which are the same or different, independently selected from the group consisting of a hydrogen atom, a halogen atom, a nitro group, and an alkyl group, an alkenyl group, an aryl group, a sulfo group, a carboxy group, an ester group, a thioester group, a dithioester group, a carbonate group, a thiocarbonate group, a dithiocarbonate group, a trithiocarbonate group, a carbamate group, a thiocarbamate group, a dithiocarbamate group, an ether group, a hydroxy group, a thiol group, a sulfide group, a disulfide group, a silyl group, an amino group, or an amide group, each of which is optionally substituted; and $R^2$ and $R^3$ are each 5 substituents, which are the same or different, independently selected from the group consisting of a hydrogen atom, a halogen atom, a nitro group, and an alkyl group, an alkenyl group, an aryl group, a sulfo group, a carboxy group, an ester group, a thioester group, a dithioester group, a carbonate group, a thiocarbonate group, a dithiocarbonate group, a trithiocarbonate group, a carbamate group, a thiocarbamate group, a dithiocarbamate group, an ether group, a hydroxy group, a thiol group, a sulfide group, a disulfide group, a silyl group, an amino group, or an amide group, each of which is optionally substituted.

2. The polymer compound according to claim 1, wherein the silicon-containing polymer is polysiloxane.

3. The polymer compound according to claim 1, wherein the silicon-containing polymer is a silicon-containing polymer having a three-armed star-like structure or a four-armed four-armed star-like structure.

4. The polymer compound according to claim 1, wherein N is 2 to 20000.

5. The polymer compound according to claim 1, wherein the partial structure represented by the formula (1) is present at one or more ends in the backbone structure.

6. The polymer compound according to claim 1, wherein the partial structure represented by the formula (1) is present at all ends in the backbone structure.

7. A multimeric compound in which a plurality of the polymer compounds according to claim 1 are linked to each other,
the multimeric compound comprising a structure that forms an intermolecular bond by a covalent bond via a hexaarylbiimidazole (HABI) group generated by reaction between lophine groups present in the partial structure of the formula (1) comprised in each of the polymer compounds, wherein
the intermolecular bond is reversibly cleaved by an external light stimulus or an external mechanical stimulus.

8. The multimeric compound according to claim 7, wherein the light stimulus is irradiation with ultraviolet light.

9. A composition comprising the multimeric compound according to claim 7.

10. The composition according to claim 9, further comprising a silicon-containing polymer having a cyclic structure.

11. The composition according to claim 10, wherein the silicon-containing polymer having the cyclic structure has HABI groups in a molecule.

12. The composition according to claim 9, selected from the group consisting of adhesives, pressure-sensitive adhesives, and viscosity modifiers.

13. A method of reversibly controlling fluidity of a polymer material, the method comprising
a step of applying a light stimulus and a mechanical stimulus to a polymer material including the multimeric compound according to claim 7 to cleave an intermolecular bond via the HABI groups and producing a monomer compound having a triphenylimidazolyl radical.

14. The method according to claim 13, wherein the light stimulus is irradiation with ultraviolet light.

15. The method according to claim 13, further comprising a step of stopping the light stimulus or the mechanical stimulus to form the intermolecular bond via the HABI groups again and returning to the multimeric compound.

16. A method of producing a polymer compound having a backbone structure consisting of a silicon-containing polymer and having a partial structure represented by the following formula (1) at an end or side chain of the backbone structure:

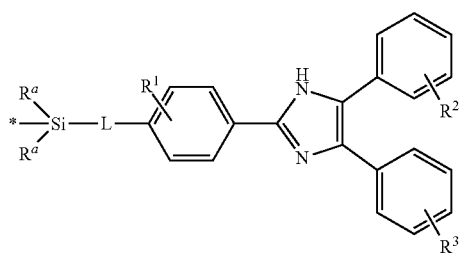

(1)

wherein * represents a linking point with the backbone structure; L is a direct bond, a silicon-containing spacer group or a $C_1$-$C_5$ alkylene group; $R^a$ is independently a $C_1$-$C_5$ alkyl group; $R^1$ is 4 substituents, which are the same or different, independently selected from the group consisting of a hydrogen atom, a halogen atom, a nitro group, and an alkyl group, an alkenyl group, an aryl group, a sulfo group, a carboxy group, an ester group, a thioester group, a dithioester group, a carbonate group, a thiocarbonate group, a dithiocarbonate group, a trithiocarbonate group, a carbamate group, a thiocarbamate group, a dithiocarbamate group, an ether group, a hydroxy group, a thiol group, a sulfide group, a disulfide group, a silyl group, an amino group, or an amide group, each of which is optionally substituted; and $R^2$ and $R^3$ are each 5 substituents, which are the same or different, independently selected from the group consisting of a hydrogen atom, a halogen atom, a nitro group, and an alkyl group, an alkenyl group, an aryl group, a sulfo group, a carboxy group, an ester group, a thioester group, a dithioester group, a carbonate group, a thiocarbonate group, a dithiocarbonate group, a trithiocarbonate group, a carbamate group, a thiocarbamate group, a dithiocarbamate group, an ether group, a hydroxy group, a thiol group, a sulfide group, a disulfide group, a silyl group, an amino group, or an amide group, each of which is optionally substituted, the production method comprising a step of reacting a silicon-containing polymer having a vinyl group with a hydrosilane-substituted arylimidazole compound represented by the following formula (2) to obtain the polymer compound:

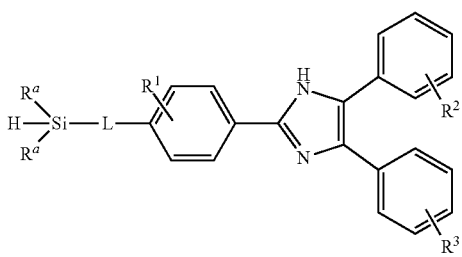

(2)

wherein L, $R^a$, $R^1$, $R^2$ and $R^3$ have the same definition as the formula (1).

17. The production method according to claim 16, wherein the reaction is carried out in the presence of a transition metal catalyst.

18. The production method according to claim 17, wherein the transition metal catalyst is a platinum complex.

19. The production method according to claim 16, wherein the silicon-containing polymer is polysiloxane.

20. The production method according to claim 16, wherein the silicon-containing polymer is a silicon-containing polymer having a three-armed star-like structure or a four-armed star-like structure.

21. A hydrosilane-substituted arylimidazole compound represented by the following formula (2):

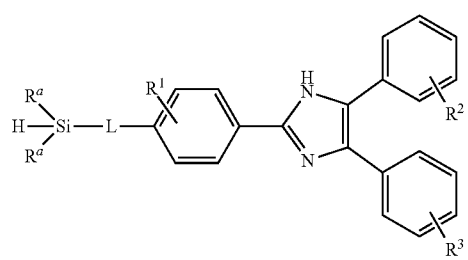

(2)

wherein L is a direct bond, a silicon-containing spacer group or a $C_1$-$C_5$ alkylene group; $R^a$ is independently a $C_1$-$C_6$ alkyl group; $R^1$ is 4 substituents, which are the same or different, independently selected from the group consisting of a hydrogen atom, a halogen atom, a nitro group, and an alkyl group, an alkenyl group, an aryl group, a sulfo group, a carboxy group, an ester group, a thioester group, a dithioester group, a carbonate group, a thiocarbonate group, a dithiocarbonate group, a trithiocarbonate group, a carbamate group, a thiocarbamate group, a dithiocarbamate group, an ether group, a hydroxy group, a thiol group, a sulfide group, a disulfide group, a silyl group, an amino group, or an amide group, each of which is optionally substituted; and $R^2$ and $R^3$ are each 5 substituents, which are the same or different, independently selected from the group consisting of a hydrogen atom, a halogen atom, a nitro group, and an alkyl group, an alkenyl group, an aryl group, a sulfo group, a carboxy group, an ester group, a thioester group, a dithioester group, a carbonate group, a thiocarbonate group, a dithiocarbonate group, a trithiocarbonate group, a carbamate group, a thiocarbamate group, a dithiocarbamate group, an ether group, a hydroxy group, a thiol group, a sulfide group, a disulfide group, a silyl group, an amino group, or an amide group, each of which is optionally substituted.

* * * * *